(12) United States Patent
    Chiba et al.

(10) Patent No.: US 11,392,110 B2
(45) Date of Patent: Jul. 19, 2022

(54) INFORMATION MANAGEMENT SYSTEM

(71) Applicants: KABUSHIKI KAISHA TOSHIBA, Minato-ku (JP); TOSHIBA DIGITAL SOLUTIONS CORPORATION, Kawasaki (JP)

(72) Inventors: Katsuhisa Chiba, Koganei (JP); Masanori Tajima, Kawasaki (JP)

(73) Assignees: KABUSHIKI KAISHA TOSHIBA, Minato-ku (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 135 days.

(21) Appl. No.: 16/341,179

(22) PCT Filed: Sep. 29, 2017

(86) PCT No.: PCT/JP2017/035382
§ 371 (c)(1),
(2) Date: Apr. 11, 2019

(87) PCT Pub. No.: WO2018/079185
PCT Pub. Date: May 3, 2018

(65) Prior Publication Data
US 2019/0258230 A1    Aug. 22, 2019

(30) Foreign Application Priority Data
Oct. 26, 2016 (JP) .............................. JP2016-209422

(51) Int. Cl.
*G06F 16/00* (2019.01)
*G05B 19/418* (2006.01)
(Continued)

(52) U.S. Cl.
CPC ....... *G05B 19/4183* (2013.01); *G05B 19/406* (2013.01); *G05B 19/418* (2013.01);
(Continued)

(58) Field of Classification Search
CPC ...... G05B 19/4183; G05B 2219/50185; G05B 2219/31304; G05B 19/406; G05B 19/418;
(Continued)

(56) References Cited

U.S. PATENT DOCUMENTS 5,088,045 A * 2/1992 Shimanaka ...... G05B 19/41875
                                                    700/110
6,343,287 B1 * 1/2002 Kumar .................... G06F 16/25
(Continued)

FOREIGN PATENT DOCUMENTS

CN       102177477 A     9/2011
JP       2005-100284 A   4/2005
(Continued)

OTHER PUBLICATIONS

International Search Report dated Oct. 31, 2017 in PCT/JP2017/035382 (with English translation), 5 pages.
(Continued)

*Primary Examiner* — Shiow-Jy Fan
(74) *Attorney, Agent, or Firm* — Oblon, McClelland, Maier & Neustad, L.L.P.

(57) ABSTRACT

An information management system includes: a storage section storing a data model created based on product manufacturing planning, the data model corresponding to an area where manufacturing achievement data from the manufacturing process is accumulated; an information collection section configured to collect various types of data forming the manufacturing achievement data from a data source involved in the manufacturing process; and a manufacturing management section configured to store the manufacturing achievement data in the associated data model. The manufacturing management section is configured to use the various types of data to create the manufacturing achievement data according to a data structure definition template
(Continued)

for organizing the various types of data in association with a thing performed and a situation during the performance in the manufacturing process.

5 Claims, 12 Drawing Sheets

(51) Int. Cl.
*G05B 19/406* (2006.01)
*G06Q 50/04* (2012.01)
(52) U.S. Cl.
CPC ... *G06Q 50/04* (2013.01); *G05B 2219/31304* (2013.01); *G05B 2219/50185* (2013.01); *Y02P 90/02* (2015.11); *Y02P 90/30* (2015.11)
(58) Field of Classification Search
CPC ........ G06Q 10/06; G06Q 50/04; Y02P 90/02; Y02P 90/30
See application file for complete search history.

(56) References Cited

U.S. PATENT DOCUMENTS

| | | | | |
|---|---|---|---|---|
| 6,442,748 | B1* | 8/2002 | Bowman-Amuah | G06F 8/20 717/108 |
| 6,460,082 | B1* | 10/2002 | Lumelsky | G06F 9/50 709/226 |
| 8,005,879 | B2* | 8/2011 | Bornhoevd | G06F 8/60 707/899 |
| 2002/0055925 | A1* | 5/2002 | Kondo | G06F 16/00 |
| 2005/0228807 | A1* | 10/2005 | McCauley | G06F 16/25 |
| 2005/0251506 | A1* | 11/2005 | McCauley | G06F 16/256 |
| 2006/0047454 | A1* | 3/2006 | Tamaki | G06Q 10/06 702/84 |
| 2007/0118560 | A1* | 5/2007 | Bornhoevd | G06F 8/60 |
| 2007/0192464 | A1* | 8/2007 | Tullberg | H04L 61/2015 709/223 |
| 2009/0299979 | A1 | 12/2009 | Suh et al. | |
| 2011/0238429 | A1 | 9/2011 | Kawakita et al. | |
| 2013/0097547 | A1 | 4/2013 | Ohwa et al. | |
| 2014/0279795 | A1* | 9/2014 | Shibuya | G06N 5/02 706/46 |
| 2016/0012465 | A1* | 1/2016 | Sharp | G06Q 20/386 705/14.17 |
| 2016/0359825 | A1* | 12/2016 | Chand | H04L 63/145 |
| 2017/0006135 | A1* | 1/2017 | Siebel | H04L 67/10 |
| 2018/0188704 | A1* | 7/2018 | Cella | G06N 3/02 |
| 2019/0171187 | A1* | 6/2019 | Cella | G06N 20/00 |

FOREIGN PATENT DOCUMENTS

| | | |
|---|---|---|
| JP | 2005-346190 A | 12/2005 |
| JP | 2007-122682 A | 5/2007 |
| JP | 2008-225725 A | 9/2008 |
| JP | 2009-9188 A | 1/2009 |
| JP | 2013-88861 A | 5/2013 |
| JP | 2015-87803 A | 5/2015 |

OTHER PUBLICATIONS

Ryu Mika et al., "Research for quality trace system of fabricated building based on internet technology of things", Housing Industry No. 10 p. 41-47, Oct. 20, 2016.

* cited by examiner

[FIG.1]
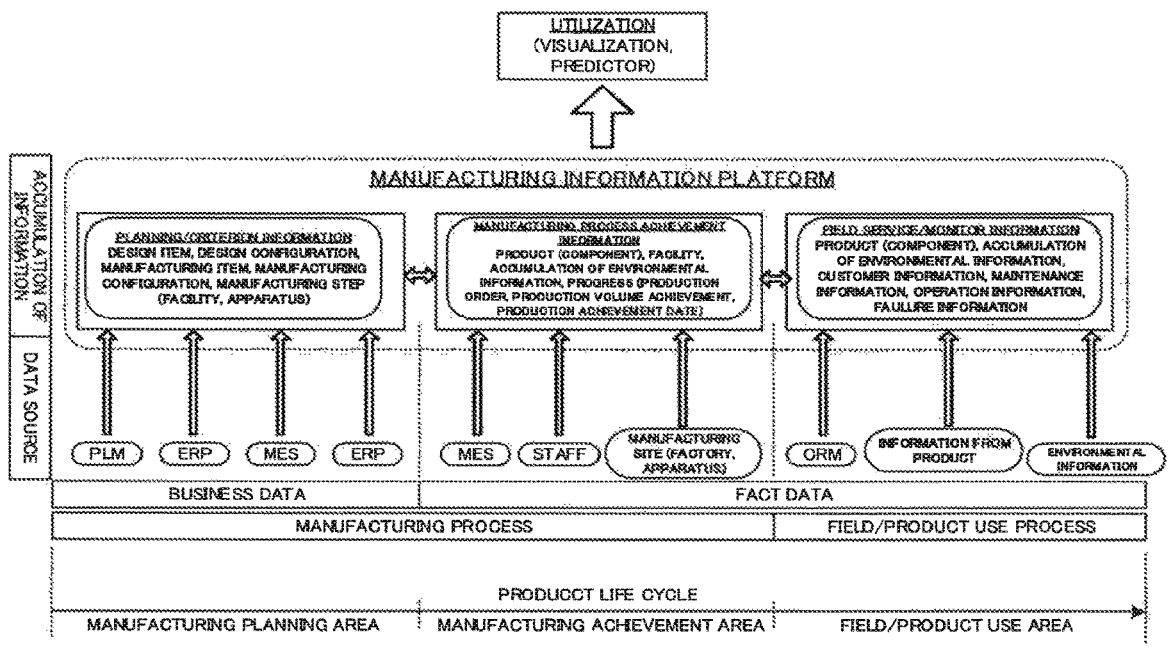

[FIG.2]
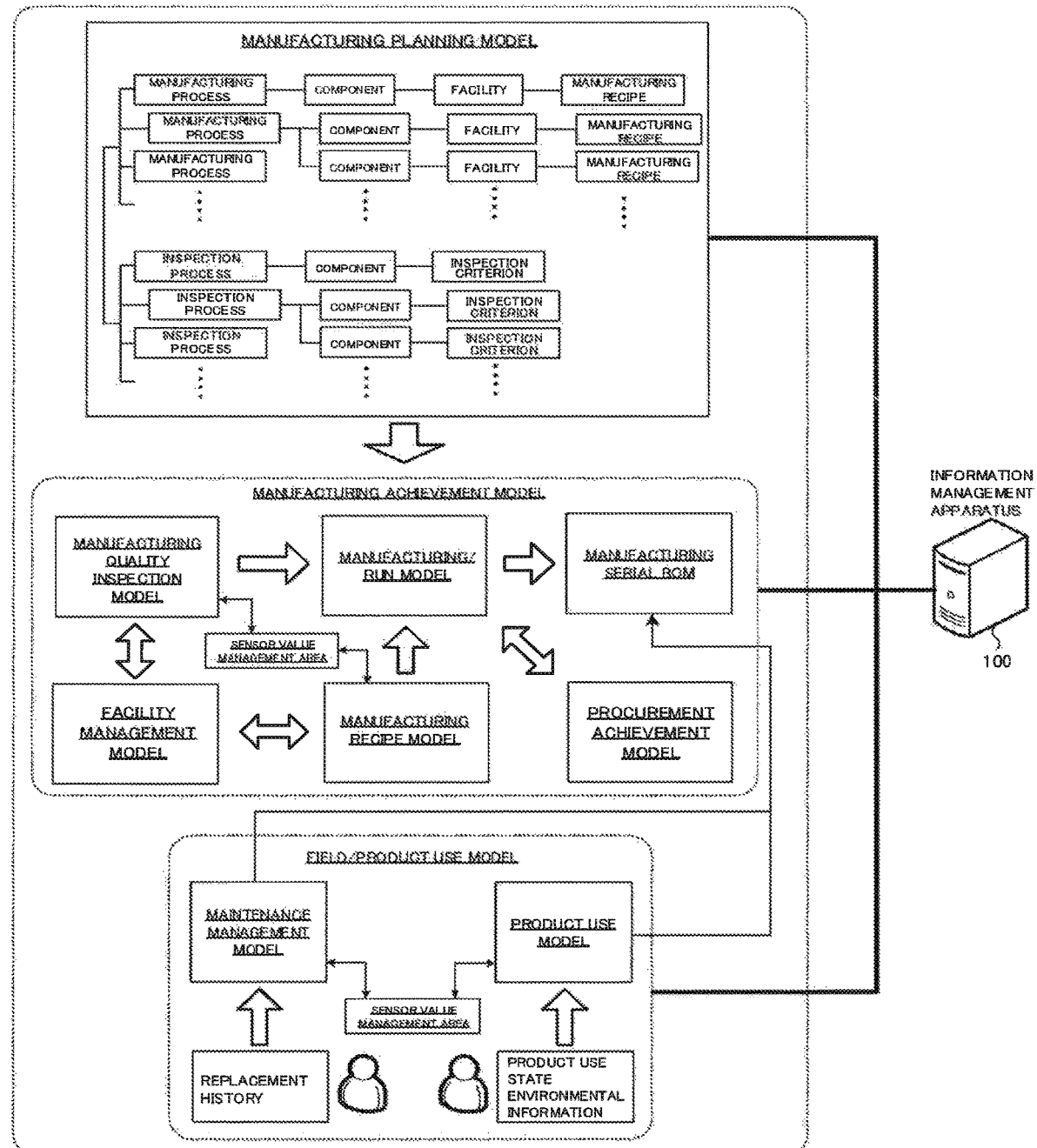

[FIG.3]
(MANUFACTURING/RUN ACHIEVEMENT DATA)
| [SUBJECT] (Who) WHO | [OBJECT] (whome) WHOM | [EVENT] (what) WHAT | [TIME] (when) WHEN | [PLACE] (Where) WHERE | [CAUSE] (Why) WHY | [SITUATION] (How) HOW |
|---|---|---|---|---|---|---|
| FACILITY2 (FACILITY SERIAL ID : 99999) | MANUFACTURING ITEM NUMBER(A-001) SERIAL ID(12345) | OVERALL PC ASSEMBLY | 2016/9/2 12:30 | FIRST STATION OF FIRST LINE OF OVERALL PC ASSEMBLY IN OVERALL PC ASSEMBLY STEP | ... | ... |
| ..... | ..... | ..... | ..... | ..... | ..... | ..... |
[FIG.4]
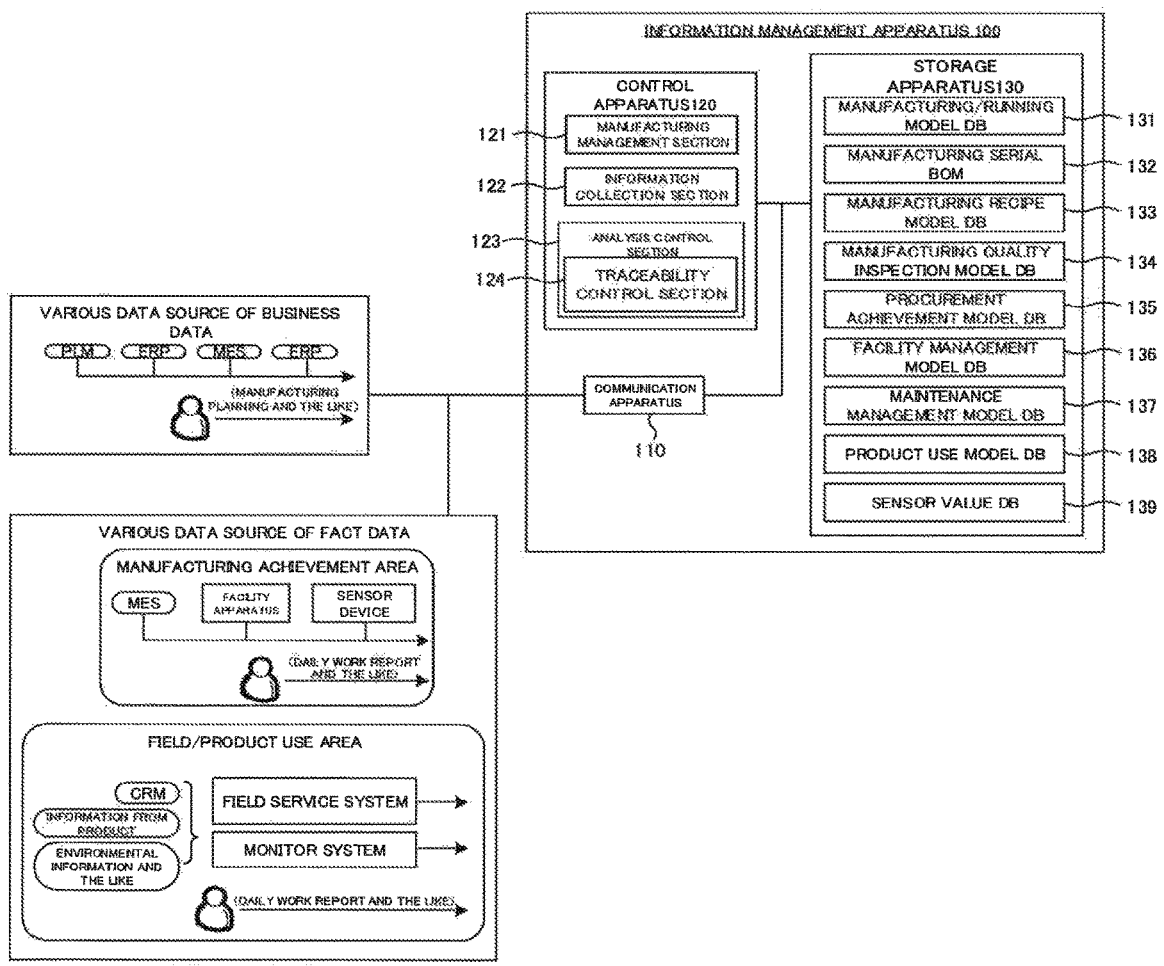

[FIG.5]
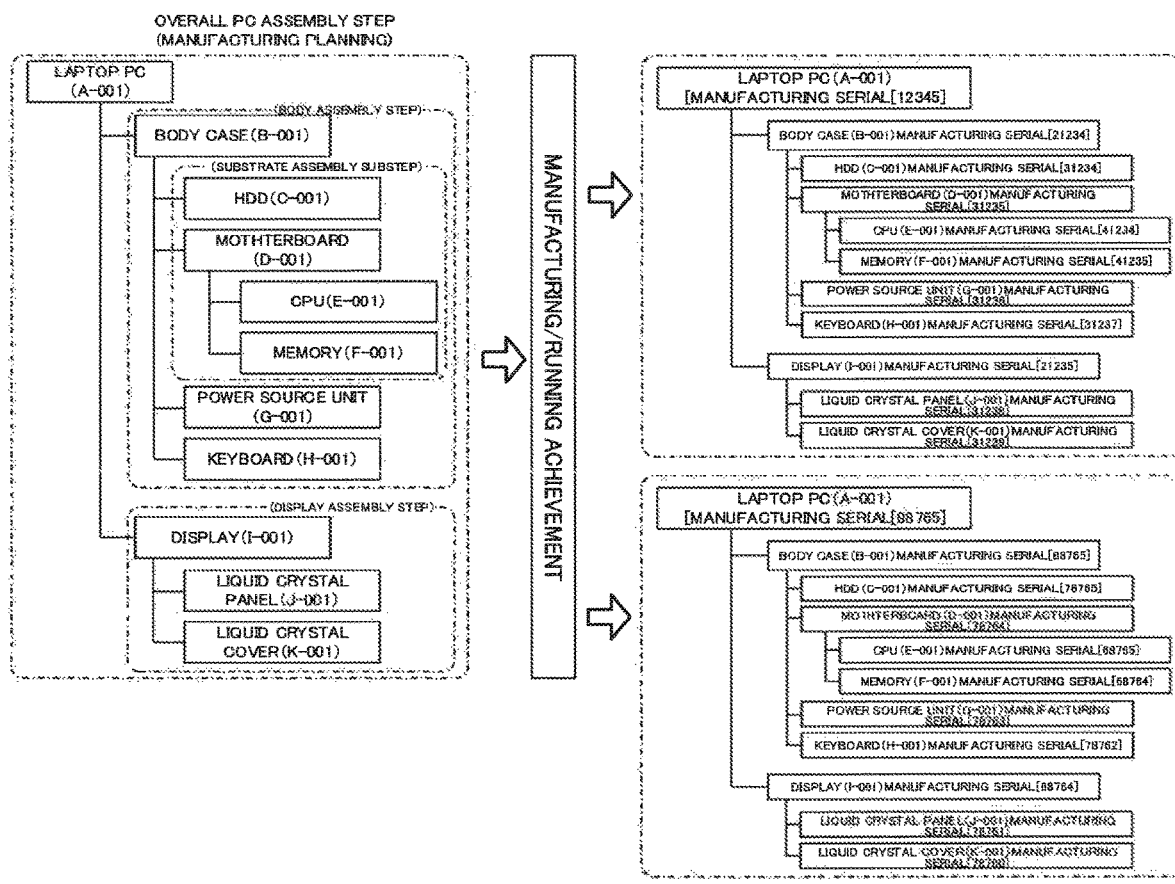

[FIG.6]

(MANUFACTURING/RUNNING ACHIEVEMENT DATA)

| [SUBJECT]<br>(Who)<br>WHO | [OBJECT]<br>(whome)<br>WHOM | [EVENT]<br>(what)<br>WHAT | [TIME]<br>(when)<br>WHEN | [PLACE]<br>(Where)<br>WHERE | [CAUSE]<br>(Why)<br>WHY | [SITUATION]<br>(How)<br>HOW |
|---|---|---|---|---|---|---|
| FACILITY1<br>(FACILITY SERIAL ID : 11111) | COMPONENT ITEM NUMBER(D-001) SERIAL ID(31235)<br>COMPONENT ITEM NUMBER(E-001) SERIAL ID(41234)<br>COMPONENT ITEM NUMBER(F-001) SERIAL ID(41235) | SUBSTRATE ASSEMBLY | 2016/9/2 10:30 | THIRD STATION OF FIRST LINE OF SUBSTRATE ASSEMBLY IN SUBSTRATE ASSEMBLY STEP | ... | ... |
| INSPECTION FACILITY1<br>(FACILITY SERIAL ID : 22222) | COMPONENT ITEM NUMBER(D-001) SERIAL ID(31235) | SUBSTRATE ASSEMBLY INSPECTION | 2016/9/2 11:00 | INSPECTION STATION OF FIRST LINE OF SUBSTRATE ASSEMBLY IN SUBSTRATE ASSEMBLY STEP | ... | ... |
| ..... | ..... | ..... | ..... | ..... | ..... | ..... |
| FACILITY2<br>(FACILITY SERIAL ID : 99999) | MANUFACTURING ITEM NUMBER(A-001) SERIAL ID(12345)<br>COMPONENT ITEM NUMBER(B-001) SERIAL ID(21234)<br>COMPONENT ITEM NUMBER(A-001) SERIAL ID(21235) | OVERALL PC ASSEMBLY | 2016/9/2 12:30 | FIRST STATION OF FIRST LINE OF OVERALL PC ASSEMBLY IN OVERALL PC ASSEMBLY STEP | ... | ... |
| ..... | ..... | ..... | ..... | ..... | ..... | ..... |

(MANUFACTURING RECIPE ACHIEVEMENT DATA) — (SENSOR INFORMATION)

| [SUBJECT]<br>(Who)<br>WHO | [OBJECT]<br>(whome)<br>WHOM | [EVENT]<br>(what)<br>WHAT | [TIME]<br>(when)<br>WHEN | [PLACE]<br>(Where)<br>WHERE | [CAUSE]<br>(Why)<br>WHY | [SITUATION]<br>(How)<br>HOW |
|---|---|---|---|---|---|---|
| FACILITY1<br>(FACILITY SERIAL ID : 11111) | COMPONENT ITEM NUMBER(D-001) SERIAL ID(31235)<br>COMPONENT ITEM NUMBER(E-001) SERIAL ID(41234) | CPU MOUNTING | 2016/9/2 10:30 | THIRD STATION OF FIRST LINE OF SUBSTRATE ASSEMBLY IN SUBSTRATE ASSEMBLY STEP | - | APPLY SOLDER AT FLOW RATE XX |
| FACILITY1<br>(FACILITY SERIAL ID : 11111) | COMPONENT ITEM NUMBER(D-001) SERIAL ID(31235)<br>COMPONENT ITEM NUMBER(F-001) SERIAL ID(41235) | MEMORY MOUNTING | 2016/9/2 10:31 | THIRD STATION OF FIRST LINE OF SUBSTRATE ASSEMBLY IN SUBSTRATE ASSEMBLY STEP | - | REFLOW AT TEMPERATURE YY |
| ..... | ..... | ..... | ..... | ..... | ..... | ..... |

(MANUFACTURING QUALITY INSPECTION DATA) — (SENSOR INFORMATION)

| [SUBJECT]<br>(Who)<br>WHO | [OBJECT]<br>(whome)<br>WHOM | [EVENT]<br>(what)<br>WHAT | [TIME]<br>(when)<br>WHEN | [PLACE]<br>(Where)<br>WHERE | [CAUSE]<br>(Why)<br>WHY | [SITUATION]<br>(How)<br>HOW |
|---|---|---|---|---|---|---|
| INSPECTION FACILITY1<br>(FACILITY SERIAL ID : 22222) | COMPONENT ITEM NUMBER(D-001) SERIAL ID(31235)<br>COMPONENT ITEM NUMBER(E-001) SERIAL ID(41234) | INSPECTION OF CPU MOUNTING | 2016/9/2 11:00 | INSPECTION STATION OF FIRST LINE OF SUBSTRATE ASSEMBLY IN SUBSTRATE ASSEMBLY STEP | - | MOUNTING CHECK OK (CONDUCTION CHECK) |
| INSPECTION FACILITY1<br>(FACILITY SERIAL ID : 22222) | COMPONENT ITEM NUMBER(D-001) SERIAL ID(31235)<br>COMPONENT ITEM NUMBER(F-001) SERIAL ID(41235) | INSPECTION OF MEMORY MOUNTING | 2016/9/2 11:01 | INSPECTION STATION OF FIRST LINE OF SUBSTRATE ASSEMBLY IN SUBSTRATE ASSEMBLY STEP | - | MOUNTING INSPECTION OK (CONDUCTION AND VIBRATION CHECK) |
| ..... | ..... | ..... | ..... | ..... | ..... | ..... |

(PROCUREMENT ACHIEVEMENT DATA)

| [SUBJECT]<br>(Who)<br>WHO | [OBJECT]<br>(whome)<br>WHOM | [EVENT]<br>(what)<br>WHAT | [TIME]<br>(when)<br>WHEN | [PLACE]<br>(Where)<br>WHERE | [CAUSE]<br>(Why)<br>WHY | [SITUATION]<br>(How)<br>HOW |
|---|---|---|---|---|---|---|
| PROCUREMENT PERSON A (STAFF SERIAL ID : 5555) | COMPONENT ITEM NUMBER(D-001) SERIAL ID(31235~) MOTHERBOARD | PROCURED | 2016/8/25 10:00 | A COMPANY MANUFACTURED IN B FACTORY | ... | ... |
| PROCUREMENT PERSON A (STAFF SERIAL ID : 5555) | COMPONENT ITEM NUMBER(F-001) SERIAL ID(41235~) MEMORY | PROCURED | 2016/8/26 15:00 | X COMPANY MANUFACTURED IN Y FACTORY | ... | ... |
| ..... | ..... | ..... | ..... | ..... | ..... | ..... |

[FIG.7]
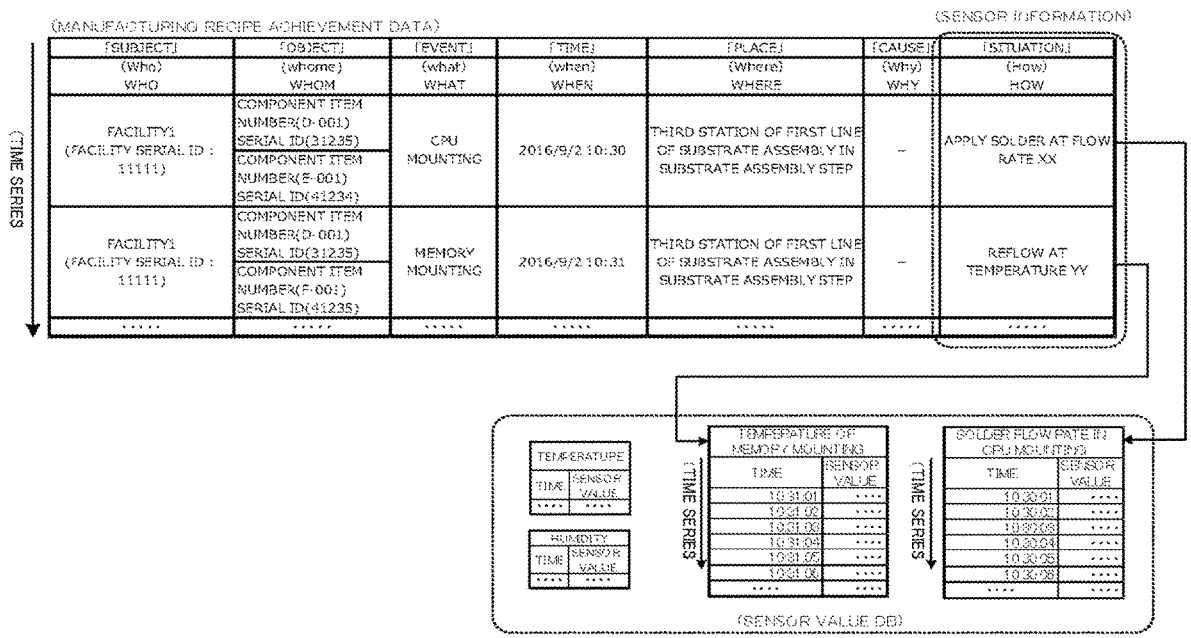
[FIG.8]

[FIG.9]

(OPERATION SITUATION HISTORY)

| [SUBJECT] (Who) WHO | [OBJECT] (whome) WHOM | [EVENT] (what) WHAT | [TIME] (when) WHEN | [PLACE] (Where) WHERE | [CAUSE] (Why) WHY | [SITUATION] (How) HOW |
|---|---|---|---|---|---|---|
| CPU TEMPERATURE SENSOR 001 | MANUFACTURING ITEM NUMBER(A-001) SERIAL ID(12345) | CPU TEMPERATURE | 2016/9/2 11:00 | BUILDING A | -- | 60°C |
| ..... | ..... | ..... | ..... | ..... | ..... | ..... |

(SENSOR VALUE)

| TEMPERATURE | |
|---|---|
| TIME | SENSOR VALUE |
| 13:31:01 | .... |
| 13:31:02 | .... |
| 13:31:03 | .... |
| 13:31:04 | .... |
| 13:31:05 | .... |
| 13:31:06 | .... |

(MAINTENANCE HISTORY)

| [SUBJECT] (Who) WHO | [OBJECT] (whome) WHOM | [EVENT] (what) WHAT | [TIME] (when) WHEN | [PLACE] (Where) WHERE | [CAUSE] (Why) WHY | [SITUATION] (How) HOW |
|---|---|---|---|---|---|---|
| MR. F | MANUFACTURING ITEM NUMBER(A-001) SERIAL ID(12345) | PART REPLACEMENT | 2016/10/1 13:00 | BUILDING A | ABNORMAL HEAT GENERATION | COMPONENT ITEM NUMBER(E-001)SERIAL ID(41234) →COMPONENT ITEM NUMBER(E-001)SERIAL ID(ZZZZZ) |
| ..... | ..... | ..... | ..... | ..... | ..... | ..... |

(EVENT/ALERT HISTORY)

| [SUBJECT] (Who) WHO | [OBJECT] (whome) WHOM | [EVENT] (what) WHAT | [TIME] (when) WHEN | [PLACE] (Where) WHERE | [CAUSE] (Why) WHY | [SITUATION] (How) HOW |
|---|---|---|---|---|---|---|
| MANUFACTURING ITEM NUMBER(A-001) SERIAL ID(12345) | | TRANSITION TO BATTERY MODE (EVENT) | 2016/11/2 15:30 | BUILDING X | -- | ENVIRONMENTAL INFORMATION (INCLUDING TEMPERATURE, HUMIDITY) |
| MANUFACTURING ITEM NUMBER(A-001) SERIAL ID(12345) | | ACTUATE HDD COOLING FAN (EVENT) | 2016/11/2 16:30 | BUILDING X | -- | ENVIRONMENTAL INFORMATION (INCLUDING TEMPERATURE, HUMIDITY) |
| MANUFACTURING ITEM NUMBER(A-001) SERIAL ID(12345) | | TRANSITION TO SLEEP MODE (EVENT) | 2016/11/2 16:38 | BUILDING X | -- | ENVIRONMENTAL INFORMATION (INCLUDING TEMPERATURE, HUMIDITY) |
| MANUFACTURING ITEM NUMBER(A-001) SERIAL ID(12345) | | TRANSITION TO NORMAL MODE (EVENT) | 2016/11/2 16:40 | BUILDING X | -- | ENVIRONMENTAL INFORMATION (INCLUDING TEMPERATURE, HUMIDITY) |
| MANUFACTURING ITEM NUMBER(A-001) SERIAL ID(12345) | | ACTUATE HDD COOLING FAN (EVENT) | 2016/11/2 16:40 | BUILDING X | -- | ENVIRONMENTAL INFORMATION (INCLUDING TEMPERATURE, HUMIDITY) |
| MANUFACTURING ITEM NUMBER(A-001) SERIAL ID(12345) | | STOP HDD COOLING FAN (EVENT) | 2016/11/2 16:44 | BUILDING X | -- | ENVIRONMENTAL INFORMATION (INCLUDING TEMPERATURE, HUMIDITY) |
| MANUFACTURING ITEM NUMBER(A-001) SERIAL ID(12345) | | HDD ALERT FOR EXCESSIVE TEMPERATURE (ALERT) | 2016/11/2 16:46 | BUILDING X | -- | ENVIRONMENTAL INFORMATION (INCLUDING TEMPERATURE, HUMIDITY) |
| ..... | ..... | ..... | ..... | ..... | ..... | ..... |

[FIG.10]
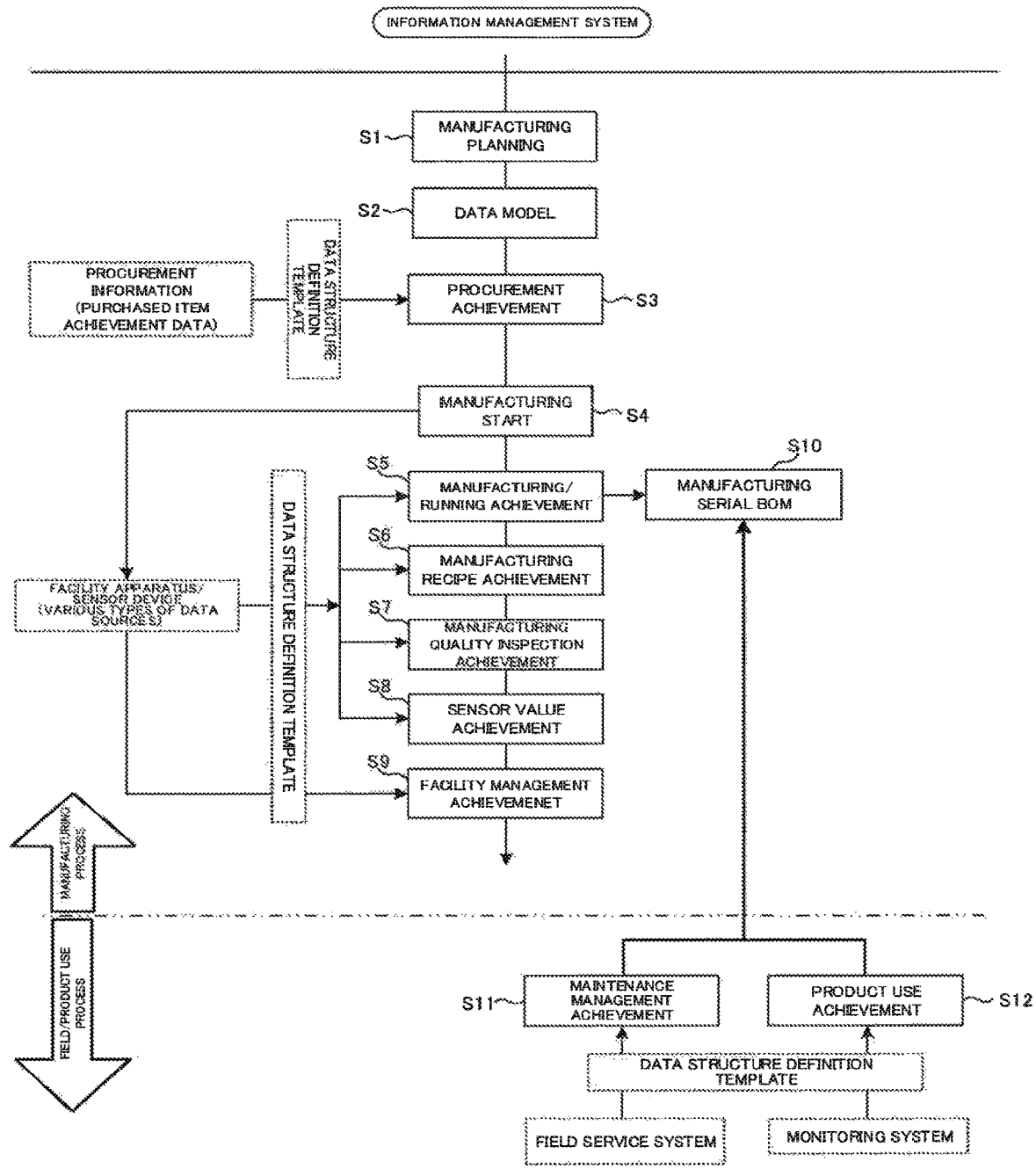

[FIG.11]
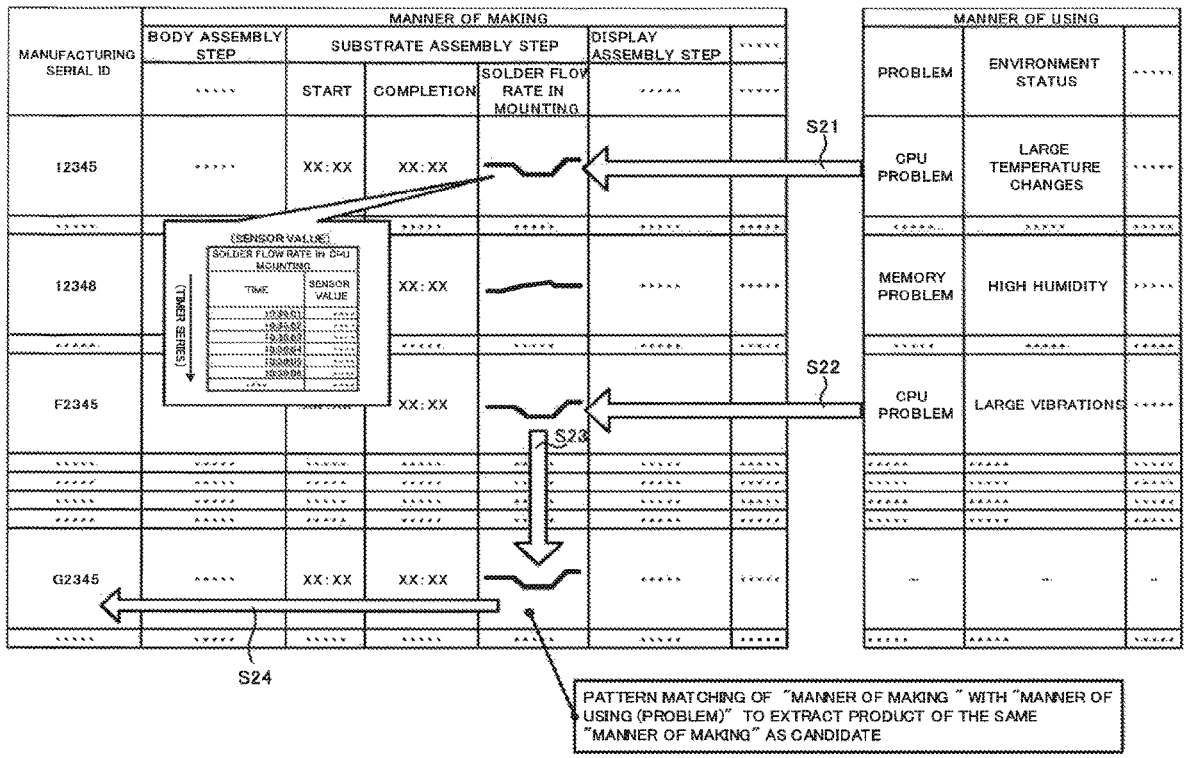
[FIG.12]
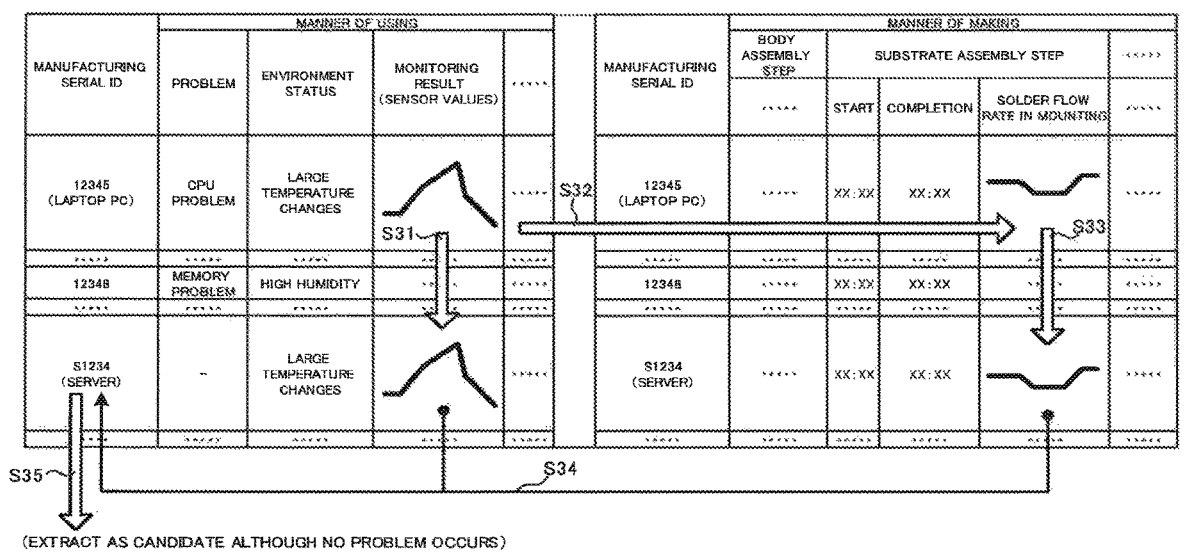

[FIG.13]
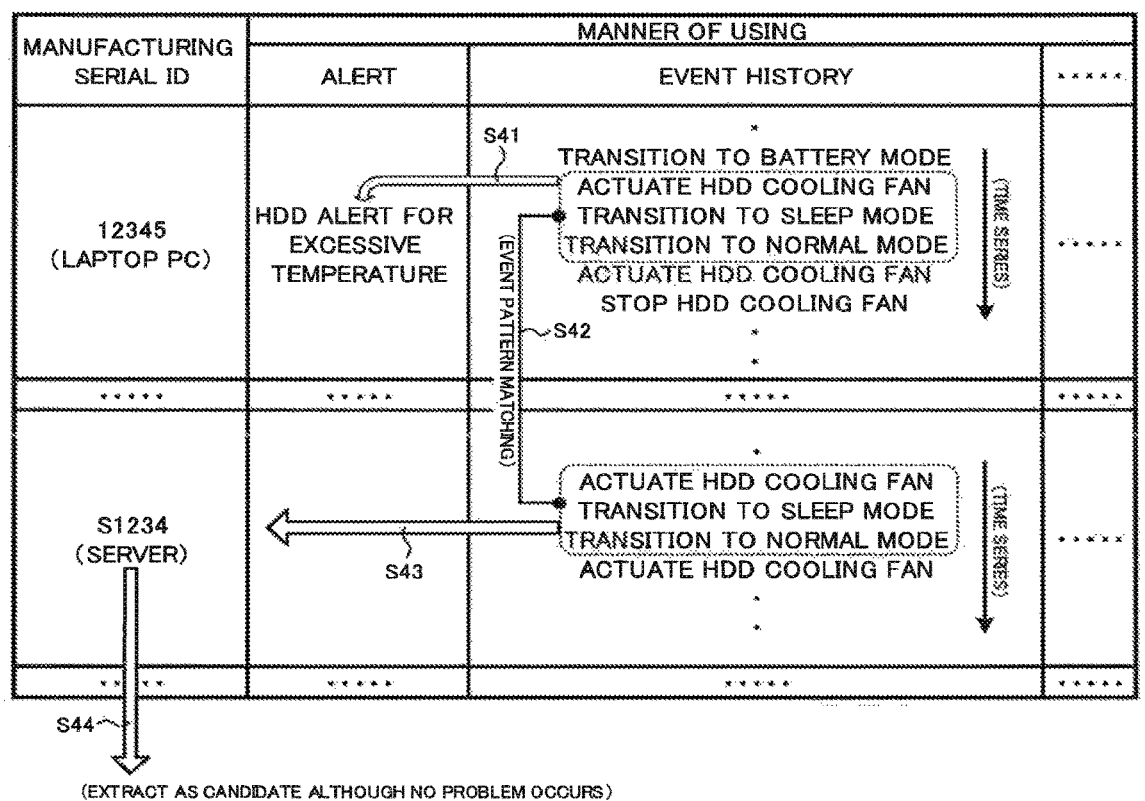

[FIG.14]
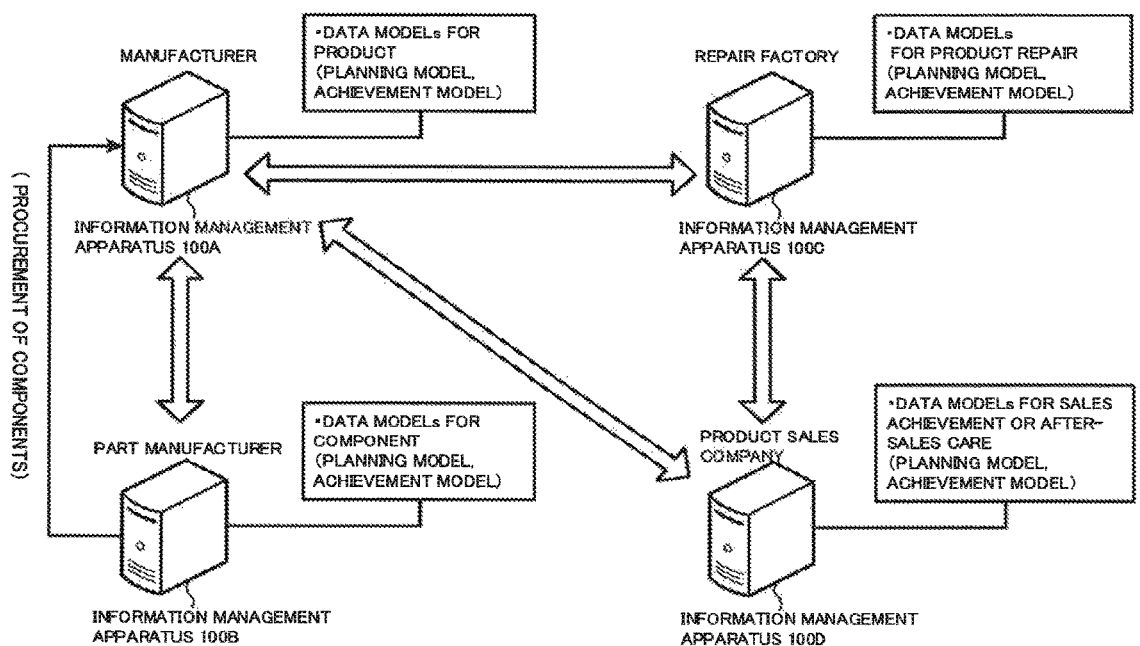

【FIG.15】

(MANUFACTURING/RUNNING ACHIEVEMENT DATA)

⟨TIME SERIES⟩

| [SUBJECT]<br>(Who)<br>WHO | [OBJECT]<br>(Whome)<br>WHOM | [EVENT]<br>(What)<br>WHAT | [TIME]<br>(When)<br>WHEN | [PLACE]<br>(Where)<br>WHERE | [CAUSE]<br>(Why)<br>WHY | [SITUATION]<br>(How)<br>HOW |
|---|---|---|---|---|---|---|
| FACILITY A<br>(FACILITY SERIAL ID : 33333) | MANUFACTURING ITEM NUMBER(D-001)<br>SERIAL ID(31235)<br>COMPONENT ITEM NUMBER(D1-001)<br>SERIAL ID(331234)<br>COMPONENT ITEM NUMBER(D2-001)<br>SERIAL ID(331235)<br>COMPONENT ITEM NUMBER(D3-001)<br>SERIAL ID(331236) | MOTHERBOARD MANUFACTURING | 2016/8/20 10:00 | FIRST LINE OF PART MOUNTING IN PART MOUNTING STEP | ... | ... |
| INSPECTION FACILITY A<br>(FACILITY SERIAL ID : 44444) | MANUFACTURING ITEM NUMBER(D-001)<br>SERIAL ID(31235) | PART MOUNTING INSPECTION | 2016/8/20 15:00 | FIRST LINE OF PART MOUNTING INSPECTION IN PART MOUNTING STEP | ... | ... |
| ..... | ..... | ..... | ..... | ..... | ..... | ..... |

(MANUFACTURING RECIPE ACHIEVEMENT DATA)

⟨TIME SERIES⟩

| [OBJECT]<br>(Whome)<br>WHOM | [EVENT]<br>(What)<br>WHAT | [TIME]<br>(When)<br>WHEN | [PLACE]<br>(Where)<br>WHERE | [CAUSE]<br>(Why)<br>WHY | [SITUATION]<br>(How)<br>HOW |
|---|---|---|---|---|---|
| MANUFACTURING ITEM NUMBER(D-001)<br>SERIAL ID(31235)<br>COMPONENT ITEM NUMBER(D1-001)<br>SERIAL ID(331234) | CAPACITOR CHIP MOUNTING | 2016/8/20 10:00 | FIRST LINE OF PART MOUNTING IN PART MOUNTING STEP | ... | REFLOW AT TEMPERATURE YY |
| MANUFACTURING ITEM NUMBER(D-001)<br>SERIAL ID(31235)<br>COMPONENT ITEM NUMBER(D2-001)<br>SERIAL ID(331235) | CPU SOCKET MOUNTING | 2016/8/20 10:03 | FIRST LINE OF PART MOUNTING IN PART MOUNTING STEP | ... | APPLY SOLDER AT FLOW RATE XX |
| MANUFACTURING ITEM NUMBER(D-001)<br>SERIAL ID(31235)<br>COMPONENT ITEM NUMBER(D3-001)<br>SERIAL ID(331236) | MEMORY SOCKET MOUNTING | 2016/8/20 10:05 | FIRST LINE OF PART MOUNTING IN PART MOUNTING STEP | ... | APPLY SOLDER AT FLOW RATE ZZ |
| ..... | ..... | ..... | ..... | ..... | ..... |

(MANUFACTURING QUALITY INSPECTION DATA)

⟨TIME SERIES⟩

| [SUBJECT]<br>(Who)<br>WHO | [OBJECT]<br>(Whome)<br>WHOM | [EVENT]<br>(What)<br>WHAT | [TIME]<br>(When)<br>WHEN | [PLACE]<br>(Where)<br>WHERE | [CAUSE]<br>(Why)<br>WHY | [SITUATION]<br>(How)<br>HOW |
|---|---|---|---|---|---|---|
| INSPECTION FACILITY A<br>(FACILITY SERIAL ID : 44444) | MANUFACTURING ITEM NUMBER(D-001)<br>SERIAL ID(31235)<br>COMPONENT ITEM NUMBER(D1-001)<br>SERIAL ID(331234) | INSPECTION OF CAPACITOR CHIP MOUNTING | 2016/8/20 15:00 | FIRST LINE OF PART MOUNTING INSPECTION IN PART MOUNTING STEP | ... | MOUNTING CHECK OK |
| | MANUFACTURING ITEM NUMBER(D-001)<br>SERIAL ID(31235)<br>COMPONENT ITEM NUMBER(D2-001)<br>SERIAL ID(331235) | INSPECTION OF CPU SOCKET MOUNTING | 2016/8/20 15:03 | FIRST LINE OF PART MOUNTING INSPECTION IN PART MOUNTING STEP | ... | MOUNTING CHECK OK |
| | MANUFACTURING ITEM NUMBER(D-001)<br>SERIAL ID(31235)<br>COMPONENT ITEM NUMBER(D3-001)<br>SERIAL ID(331235) | INSPECTION OF MEMORY SOCKET MOUNTING | 2016/8/20 15:05 | FIRST LINE OF PART MOUNTING INSPECTION IN PART MOUNTING STEP | ... | MOUNTING CHECK OK |
| ..... | ..... | ..... | ..... | ..... | ..... | ..... |

INFORMATION MANAGEMENT SYSTEM

TECHNICAL FIELD

An embodiment of the present invention relates to an information platform technique for managing a manufacturing process and a field/product use process in a market.

BACKGROUND ART

There have conventionally been techniques for collecting information from a plurality of data sources, analyzing and feeding back the collected information. For example, in a manufacturing management field, a product manufacturing process can be monitored and various types of information collected from manufacturing sites can be analyzed to assist in improving the product quality.

PRIOR ART DOCUMENT

Patent Document

[Patent Document 1] Japanese Patent Laid-Open No. 2009-9188

DISCLOSURE OF THE INVENTION

Problems to be Solved by the Invention

It is an object of the present invention to provide an information management system capable of presenting a clear picture of the whole manufacturing life cycle and analyzing it from the perspective of "the thing performed, and the state and situation during the performance."

Means for Solving the Problems

An information management system according to an embodiment manages manufacturing achievement performed in each of manufacturing processes. The information management system includes a storage section storing a data model created based on product manufacturing planning, the data model corresponding to an area where manufacturing achievement data from the manufacturing process is accumulated; an information collection section configured to collect various types of data forming the manufacturing achievement data from a data source involved in the manufacturing process; and a manufacturing management section configured to store the manufacturing achievement data in the associated data model. The manufacturing management section is configured to use the various types of data to create the manufacturing achievement data according to a data structure definition template for organizing the various types of data in association with a thing performed and a situation during the performance in the manufacturing process, and to store the manufacturing achievement data in the associated data model so as to record changes over time in the manufacturing achievement data organized according to the data structure definition template.

BRIEF DESCRIPTION OF THE DRAWINGS

FIG. 1 A conceptual diagram of an information management system according to Embodiment 1.

FIG. 2 A diagram schematically showing the system configuration of the information management system according to Embodiment 1.

FIG. 3 A diagram show in an example of an achievement record organized according to a data structure definition and accumulated in a data model according to Embodiment 1.

FIG. 4 A diagram showing the configuration of networks and the functional blocks of the information management system according to Embodiment 1.

FIG. 5 A diagram showing an example of creation of a manufacturing serial BOM (Bill Of Materials) from manufacturing planning through manufacturing/running achievement or the like according to Embodiment 1.

FIG. 6 A diagram showing examples of manufacturing/running achievement data, manufacturing recipe achievement data, product quality inspection data, and procurement achievement data according to Embodiment 1.

FIG. 7 A diagram showing the relationship between the manufacturing recipe achievement data and sensor information (sensor value DB) according to Embodiment 1.

FIG. 8 A diagram showing an example of facility management achievement data according to Embodiment 1.

FIG. 9 A diagram showing an example of maintenance management achievement data and product use achievement data (event/alert history) according to Embodiment 1.

FIG. 10 A diagram showing an information management flow from manufacturing planning to product manufacturing management and to field/product use management in a market according to Embodiment 1.

FIG. 11 A diagram for explaining a trace function of "the manner of making" from "the manner of using" according to Embodiment 1.

FIG. 12 A diagram for explaining a trace function performed by combining "the manner of using" with "the manner of making" according to Embodiment 1.

FIG. 13 A diagram for explaining an analysis function related to "the manner of using" according to Embodiment 1.

FIG. 14 A diagram for explaining an example of the system configuration in which achievement models managed individually by a plurality of information management apparatuses are linked to each other in the information management system according to Embodiment 1.

FIG. 15 A diagram showing an example of achievement data management (manufacturing/running achievement data, manufacturing recipe achievement data, and manufacturing quality inspection data of components) in a part manufacturer shown in FIG. 14.

MODE FOR CARRYING OUT THE INVENTION

Embodiments of the present invention will be described in the following with reference to the accompanying drawings.

Embodiment 1

FIG. 1 is a conceptual diagram of an information management system according to Embodiment 1. The information management system according to Embodiment 1 integrates the overall product life cycle including project, design, production (manufacturing), operation, use, and maintenance of products, and integrates the manufacturing management of manufacturing orders from manufacturing sites in real time. In other words, the information management system provides a "manufacturing" information platform as if a horizontal axis corresponding to the product life cycle intersected with a vertical axis corresponding to the manufacturing management at the manufacturing site corresponding to the center.

To provide the "manufacturing (monozukuri)" information platform, the information management system according to Embodiment 1 divides the overall product life cycle into three areas, that is, a manufacturing planning area, a manufacturing achievement area, and a field/product use area (including information representing the use states of products (the manner of using) and environmental information thereof), and collects various types of information from data sources in each of those areas (accumulation of information).

The manufacturing planning area is associated with the data type of "business data." The "business data" includes planning and criterion information such as manufacturing plans and manufacturing parameters before the manufacturing of products. The manufacturing achievement area and the field/product use area are associated with the data type of "fact data." The "fact data" includes fact and achievement information from a manufacturing process and fact and achievement information from a field/product use process. The field/product use process includes utilization and maintenance services (field services) for manufactured and sold products and monitoring services performed by collecting information about product use states and about the environment in which products are used.

FIG. 2 is a diagram schematically showing the system configuration of the information management system according to Embodiment 1. As shown in FIG. 2, the information management system according to Embodiment 1 sets, for each of the three areas including the manufacturing planning area, the manufacturing achievement area, and the field/product use area, a plurality of data models where various types of information collected from data sources are accumulated. The data model is an area in which information is accumulated.

In the manufacturing planning area, various models are set, for example including models of design P/N, design BOM, production planning, production line/pit, production factory, apparatus/device, manufacturing BOM, and manufacturing P/N. For simplifying description, the manufacturing planning area is described in the following assuming that a manufacturing planning model is set.

In the manufacturing achievement area, various models are set, for example including a manufacturing/running model, a manufacturing recipe model, a manufacturing quality inspection model, a facility management model, and a procurement achievement model, in the manufacturing achievement area, a sensor value management area is also reserved for accumulating sensor values from facility apparatuses and sensor devices installed in the manufacturing sites. The data models within the manufacturing achievement area are associated with each other based on manufacturing planning. In the field/product use area, for example, a maintenance management model and a product use model are set based on utilization and maintenance of manufactured and sold products and product use states including information about the environment in which products are used. In this manner, the plurality of models are constituted in accordance with the nature of data.

In each area, the information management system extracts and accumulates information pertaining to each data model from various types of information collected from data sources. In Embodiment 1, the extraction of the information pertaining to each data model is performed by extracting (selecting) information collected from a plurality of data sources throughout the product life cycle according to a data structure definition including "subject (Who)," "object (Whom)," "event (What)," "time (When)," "place (Where)," and "situation (How)" (5W1H), and then structuring the extracted information into each data model and accumulating the information. It should be noted that Embodiment 1 is described in conjunction with the data structure definition additionally including "cause (Why)" (6W1H) to accumulate information when products or facilities suffer from any problem.

FIG. 3 shows an example in which fact/achievement data collected from data sources is organized in association with the data structure definition and accumulated as a manufacturing/running model. The data structure definition is a template for accumulating data by setting the subject of a data source as "subject" and arranging what the "subject" has done on which object ("event"). For example, the information management system collects information from a facility 2 serving as a data source through a MES (Manufacturing Execution System). The facility 2 runs in a manufacturing process based on manufacturing planning, and the running achievement is collected by the information management system in real time. The thing performed in the manufacturing process at a facility 2, and the state and situation during the performance are organized using the data structure definition template to create achievement data, as shown in FIG. 3, representing that the facility 2 (subject) has done overall PC assembly (event) on products having a specific manufacturing item number (object).

Achievement records created based on the data structure definition are accumulated in time series on each data model. In other words, in Embodiment 1, manufacturing process achievement information is recorded in the form of changes over time in achievement record (6W1H) organized using the data structure definition. This structuring can present a clear picture of the things performed, and the states and situations during the performance (for example, as if the manufacturing situation of the product was taken and represented as an image) in each data model. Similarly, in the field/product use process, data is organized using the data structure definition template. For example, the thing performed in a field/product use process of a product A, and the state and situation during the performance are accumulated. Each achievement information in the manufacturing process and each achievement information in the field/product use process are not limited to achievement values (data), and still images or moving images may be used. However, Embodiment 1 is described in the case where the achievement information is the achievement value (data).

While the data items of 6W1H are specified in the data structure definition, the created achievement record does not necessarily include all those items. For example, an achievement record which does not include the items "cause (Why)" and "situation (How)" may be created in the manufacturing/running model in FIG. 3. In addition, an achievement record may be created to include all the data fields, and each time information is collected from a data source, the associated data field is filled in with the information, thereby creating the achievement record including some blank fields.

The information management system according to Embodiment 1 prepares the data models where information is accumulated in the manufacturing information platform, organizes the information collected from the data sources based on the data structure definition for retrospectively presenting a clear picture of the things performed in manufacturing, and the states and situations during the performance, and accumulates the information in each data model.

Instead of accumulating information collected from a plurality of data sources with no conditions and subsequently retrieving and editing the information into a useful record, the information management system can provide, from the start, "the thing performed, and the state and situation during the performance" in parallel with the accumulation of information.

The achievement record for each data model includes at least individual identification information for uniquely identifying a product (component) and time information, and a plurality of data models are connected with each other such that the individual identification information and the time information are used as keys, so that tracing of products can be performed throughout the manufacturing life cycle, for example, tracing of different products which undergo the same manufacturing process or different products which include the same component. In this regard, information collected from data sources have conventionally been connected with a single product such that additional information for each, manufacturing process or each event can be linked to the single product. As a result, conventionally, a clear picture of the things performed on the product, and the states and situations during the performance have not been able to be provided, thereby making it difficult to perform tracing across different products, for example. In contrast, Embodiment 1 can present a clear picture of the overall manufacturing life cycle and analyze it in the manufacturing site based on the perspective of "state and situation" of the manufacturing process.

FIG. 4 is a diagram showing the configuration of networks and the functional blocks of the information management system according to Embodiment 1.

An information management apparatus 100 according to Embodiment 1 is connected through a network to a manufacturing facility apparatus for products (including parts forming the products) and a sensor device installed in a manufacturing site. The manufacturing facility apparatus is provided with various types of sensor devices for collecting necessary information in a manufacturing process. These devices correspond to the data sources shown in FIG. 1. The information management apparatus 100 is connected through a network to a predetermined field service system or a predetermined monitoring system. The manufacturing site and product utilization/operation site are not limited to within the country but may be outside the country.

The information management apparatus 100 is configured to include a communication apparatus 110, a control apparatus 120, and a storage apparatus 130. The information management apparatus 100 can be formed of a single or a plurality of computer apparatuses and may be configured in a distributed system. The storage apparatus 130 has areas (storage areas) set therein for accumulating the data models described above, including a manufacturing/running model DB 131, a manufacturing serial BOM DB 132, a manufacturing recipe model DB 133, a manufacturing quality inspection model 134, a procurement achievement model DB 135, a facility management model DB 136, a maintenance management model DB 137, a product use model 138, and a sensor value DB 139. Each of the data models may be dynamically created in accordance with the manufacturing planning or field/product use process (the manner of using a product acquired from a field service or a monitoring system) or may be previously created.

The control apparatus 120 is responsible for the overall control of the information management system and configured to include a manufacturing management section 121, an information collection section 122, an analysis control section 123, and a traceability control section 124.

As shown in FIG. 1, products undergo project and design, and then manufacturing planning is performed. The manufacturing planning mainly includes determining each manufacturing process for manufacturing products, components constituting products, facility apparatuses for use in each manufacturing process, and manufacturing parameters (manufacturing recipe) in facility apparatuses.

The manufacturing management section 121 manages each information related to project and design of products, and manufacturing planning, and also manages resource information related to manufacturing facilities (or manufacturing lines) installed in the manufacturing site. Each resource in the manufacturing site can be managed by using master information including a facility serial ID assigned to each place and facility (or manufacturing line).

The manufacturing planning corresponds to specifications which describe the course over which the product is manufactured. The manufacturing planning is assigned resource information related to manufacturing facility and the like to allow determination of "at which facility," "on what," and "how to do what." Based on a received order, "from when" each manufacturing process should be started is optimized, and then the manufacturing process is started in the manufacturing site.

FIG. 5 shows an example of manufacturing planning and manufacturing serial BOM in an overall PC assembly step. In the example of FIG. 5, the laptop PC assembly step mainly includes a body assembly step and a display assembly step, and the body assembly step includes a substrate assembly substep. Each of the steps is associated with a component (part) in a hierarchy structure.

For the manufacturing planning, actual manufacturing achievement and facility apparatus running achievement are accumulated. FIG. 6 is a diagram showing examples of an achievement record accumulated in a manufacturing achievement model. An example of manufacturing/running achievement data is shown at the top in FIG. 6.

The relationship between planning and achievement is now described. In the manufacturing/running achievement data, information collected and accumulated from facility apparatuses pertains to "object" and "time," and the other information pertaining to "subject," "event," and "place" is information previously created in manufacturing planning. Specifically, in a manufacturing process at the facility 1, manufacturing planning related to manufacturing and running is previously created such that the facility 1 (subject) starts motherboard substrate assembly (event) in a third station of a first line (place) at "10:30 on Sep. 2, 2016" (time). For the created planning, "object" and "time" corresponding to achievement values are accumulated as the achievement record. In addition, in a manufacturing process at the facility 2, manufacturing planning related to manufacturing and achievement is previously created such that the facility 2 (subject) starts overall laptop PC assembly (event) in a first station of the first line (place) at "12:30 on Sep. 2, 2016" (time).

More specifically, for manufacturing of a laptop PC having a manufacturing item number (A-001) and a serial ID (12345), as shown in the manufacturing/running achievement data of FIG. 6, the information is saved which represents that the facility 1 (subject) started the manufacturing of the "object," that is, a motherboard having a component item number (D-001) and a serial ID (31235) at 10:30 on Sep. 2, 2016 as planned, and completed the mounting of a CPU having a component item number (E-001) and a serial ID (41234) and the mounting of a memory having a component item number (F-001) and a serial ID (41235). In addition, the information is saved which represents that the facility 2 (subject) started the manufacturing of the laptop PC having the manufacturing item number (A-001) and the serial ID (12345) at 12:30 on Sep. 2, 2016 as planned, and completed the assembly of a body case having a component item number (B-001) and a serial ID (21234) and the assembly of a display having a component item number (I-001) and a serial ID (21235). In this manner, the information obtained in the manufacturing planning can be used to organize and accumulate data according to the data structure definition based on "6W1H." It should be noted that data is organized and accumulated in any manner as long as the manufacturing process achievement information can be recorded in the form of changes over time in the achievement record (6W1H) organized according to the data structure definition.

In the "object" which is the achievement value, identification information including manufacturing item numbers and serial IDs (individual identification information) is accumulated. In the example of FIG. 5, the manufacturing item number pertains to "laptop PC" Another manufacturing item number is assigned to a desktop PC. The serial ID is individual identification information for uniquely identifying each of laptop PCs, and a different serial ID is assigned to each laptop PC. The component item number is an item number common to components of the same type, and the component serial ID is an ID unique to each component.

The combination of the manufacturing item number and the serial ID (individual identification information) can specify the product and its component uniquely. The serial ID is read or given in accumulation of the achievement value in each achievement data. For example, in mounting of a CPU on a motherboard, the facility 1 can read the barcode of the unique serial ID previously assigned to each CPU and accumulate the read serial ID in the achievement data in association with the manufacturing item number.

The detailed achievement of each object in the manufacturing/running achievement data is stored in manufacturing recipe achievement data shown in FIG. 6. In the manufacturing recipe achievement data, information collected and accumulated from the facility apparatus is actual measurement values from "object," "time," and "situation (manufacturing parameters)" and the other information "subject," "event", and "place" follows the previously created manufacturing planning. Specifically, the manufacturing planning specifies that the facility 1 is a substrate assembly line and starts each of manufacturing processes including "mounting of CPU on motherboard" and "mounting of memory on motherboard" in a third station at a predetermined time in a manner necessary for the mounting and assembly. For the manufacturing planning, the achievement values including "object," "time," and "situation" are organized and accumulated according to the data structure definition to provide the manufacturing recipe achievement data.

Specifically, as shown in the manufacturing recipe achievement data of FIG. 6, the achievement is stored which represents that the CPU having the component item number (E-001) and the serial ID (41234) and corresponding to "object" in the manufacturing/running achievement data was mounted onto the motherboard having the component item number (D-001) and the serial ID (31235) by soldering to the motherboard (situation) at a flow rate XX at 10:30 on Sep. 2, 2016 (time).

In the manufacturing recipe achievement data, a sensor value detected in real time is accumulated in "situation." The sensor value is sensor information output from a sensor device provided for the facility 1 or sensor information output from a sensor device provided separately from the facility 1 for obtaining the situation of the facility 1.

The sensor information is configured to include a group of sensor values detected in time series at predetermined time intervals. In the "situation" of the manufacturing recipe achievement data, the average value or median value of the group of sensor values successive in time series, or the representative value detected at a predetermined timing is used. As shown in FIG. 7, each data of the group of sensor values is stored in the sensor value DB 139 in association with each manufacturing process such as "CPU mounting" and "memory mounting." The sensor information accumulated in the sensor value DB 139 includes sensor values output from the facility apparatus in each manufacturing process or sensor values necessary for manufacturing and inspection, and comprises information elements in time series.

Returning to FIG. 6, from the accumulation of the manufacturing/running achievement data, a manufacturing serial BOM (Bill of Material) of each product is created for the manufacturing planning shown in FIG. 3. The manufacturing serial BOM includes unique serial IDs of components for each product organized in a hierarchy structure and can present a family tree of a plurality of components constituting each product.

The manufacturing/running achievement data also includes an inspection process performed in an inspection facility 1. Specifically, in the inspection process performed in the inspection facility 1 to inspect the mounting of the CPU and the memory on the motherboard having the manufacturing item number (D-001) and the serial ID (31235) corresponding to "object" in the manufacturing/running achievement data of FIG. 6, manufacturing planning related to manufacturing/running is previously created such that the inspection facility 1 starts the inspection of the CPU and memory mounting in an inspection station of a first line at "11:00 on Sep. 2, 2016." For the created planning, "object" and "time" corresponding to the achievement values and "situation" corresponding to the inspection result are accumulated to provide the manufacturing/running achievement data.

In manufacturing quality inspection data, information collected and accumulated from the facility apparatus is achievement values from "object," "time," and "situation (inspection result)," and the other information "subject," as "event," and "place" follow the previously created manufacturing planning. Specifically, the manufacturing planning specifies that the inspection facility 1 is an inspection line and starts each of inspection processes including "inspection of CPU mounting" and "inspection of memory mounting" in the inspection station at a predetermined time. For the manufacturing planning, the achievement values including "object," "time," and "situation" are accumulated to provide the manufacturing quality inspection data.

Specifically, as shown in the manufacturing quality inspection data of FIG. 6, the inspection of mounting of the CPU having the component item number (E-001) and the serial ID (41234) on the motherboard having the manufacturing item number (D-001) and the serial ID (31235) corresponding to "object" in the manufacturing/running achievement data was performed at 11:00 on Sep. 2, 2016, and as a result, the achievement (situation) indicating no problem found in mounting check is stored. Similarly, the achievement of the memory mounting is also stored.

In Embodiment 1, procurement achievement data shown in FIG. 6 is stored as purchased item achievement data related to product components used in, the manufacturing process. The accumulation of the procurement achievement in the data model can present the manufacturing history of each of the components constituting the product. In the example of FIG. 6, the achievement is stored which represents that procurement person A (staff serial ID 5555) purchased the motherboards (object) having the component item number (D-001) and serial IDs (31235-) corresponding to "object" in the manufacturing/running achievement data from a company A at 10:00 on Aug. 25, 2016. The fact that the components purchased from the company A were manufactured in a factory B of the company A can also be stored. This applies to the procurement achievement data related to the memory.

FIG. 8 is a diagram showing an example of facility management achievement data which is configured to include a facility alert history and a facility maintenance history. The facility alert history specifies which facility apparatus had what type of abnormality when, and what measures were taken against, the abnormality. The facility maintenance history specifies which worker performed what type of maintenance (including part replacement and repair) on which facility apparatus when, and the history of a part (for example, a serial ID) replaced in the maintenance. They are organized according to the data structure definition based on "6W1H" and stored as achievement records.

FIG. 9 is a diagram showing examples of maintenance management achievement data and product use achievement data.

As shown in FIG. 9, the maintenance management achievement data is configured to include an operation situation history and a maintenance history. The maintenance management achievement data belongs to the field/product use area shown in FIG. 1 and corresponds to a data model for use in product maintenance management on the user's side after the product shipment.

The operation situation history is product monitoring information and includes, for example, a monitoring result representing the time when a CPU temperature sensor started the monitoring of the CPU temperature of a product and the temperature level at that time. A group of sensor values successive in time series output from the CPU temperature sensor is separately collected and can be stored, for example in a storage area on the side of the field service system. In this case, the operation situation history is managed to connect with the information of the group of sensor values in cooperation with the field service system. In addition, the field service system can transmit the data of the group of sensor values to the information management apparatus 100 at a predetermined timing or the information management apparatus 100 can connect to the field service system to refer to the data of the group of sensor values.

The maintenance history is a history of product maintenance performed by a user. Similarly to the facility maintenance history of FIG. 8, the maintenance history specifies which worker performed what type of maintenance (including part replacement and repair) on which product when, and the history of a part (for example, a serial ID) replaced in the maintenance. The maintenance history can accumulate the information about why the maintenance was performed, that is, the failure cause. The maintenance management achievement data is also organized according to the data structure definition based on "6W1H" and stored as achievement records.

The product use achievement data is configured to include an event/alert history. The product use achievement data belongs to the field/product use area shown in FIG. 1 and corresponds to a data model for use in management of the product use state including information about the environment in which products are used.

The event/alert history is monitoring information about the product use state, and for example, includes a monitoring result including the state transition of a product operation event and a service function (event log and service log) and a history of alert for the product running situation (sensor value indicating excessive temperature and the like). Such a monitoring result can be collected and managed by a monitoring system connected to the product through a network. The example of FIG. 9 shows the monitoring result when the "subject" corresponding to the product having the manufacturing item number "A-001" and the serial ID "12345" made transitions of states (events) in time series to a battery mode, to actuation of an HDD cooling fan, to a sleep mode, to a normal mode, to actuation of the HDD cooling fan, and to stop of the HDD cooling fan. The environmental information (sensor detection values such as temperature and humidity) of the product corresponding to the monitoring target can also be collected as a group of sensor values successive in time series.

The information (data) in the maintenance history and the event/alert history may be transmitted not only from each system managed by the field service or the monitoring system to the information management apparatus 100 but also directly from a product corresponding to the maintenance target or the monitoring target to the information management apparatus 100 through a network.

FIG. 10 is a diagram showing an information management flow from the manufacturing planning in the information management system according to Embodiment 1, through product manufacturing management, to field/product use management in a market after shipment.

The information management apparatus 100 receives the input of the product manufacturing planning as shown in FIG. 5 (S1) and creates each of the data models including the manufacturing/running model, manufacturing recipe model, manufacturing quality inspection model, facility management model, and procurement, achievement model (S2). As the manufacturing is started, the information management apparatus 100 accumulates achievement values and sensor values for each data model based on the manufacturing planning (S4 to S8). At those steps, the information collection section 122 collects the information from the facility apparatus and the sensor device, and the manufacturing management section 121 organizes the collected information according to the data structure definition based on "6W1H" to record the changes over time in achievement record representing the things performed, and the states and situations during the performance. Similarly, the information management apparatus 100 records, in the facility management model, the changes over time in achievement record showing the things performed, and the states and situations during the performance in the facility apparatus and the sensor device (S9). At step S3, before the start of manufacturing, the procurement achievement of product components is input and accumulated in the procurement achievement model. The information accumulation in each data model may be performed through manual input as required.

In the manufacturing/running achievement data, the overall process from planning to manufacturing of one product is accumulated, and the serial IDs of each product and of the components constituting the product are accumulated. The manufacturing management section 121 creates the manufacturing serial BON associated with the manufacturing planning shown in FIG. 5 for each of the products and stores the created manufacturing serial BOM in the storage apparatus 130 (S10). For example, in the manufacturing/running achievement data, the manufacturing management section 121 can extract the serial IDs of components of a laptop PC in each manufacturing process by using the manufacturing serial ID of the laptop PC as a key, and uses the connections with the components hierarchized in the manufacturing planning to associate the extracted serial IDs of the components with the manufacturing serial ID of the laptop PC, thereby creating the manufacturing serial BOM.

The management of the product manufactured through the manufacturing process shown in FIG. 1 transitions to field/product use management on the user's side. In the maintenance management model and the product use model, the information management apparatus 100 acquires monitoring information and running situation of each product, alert history, maintenance history, and event/alert history monitored and collected in the field service system or the monitoring system, and the manufacturing management section 121 records the changes over time in achievement record representing the things performed, and the states and situations during the performance in the field/manufacturing use management (S11, S12). A step S2, the maintenance management model and the product use model on the user's side can be created, as a "manner of using" model in a predetermined field service or monitoring system, previously in the manufacturing process simultaneously with data model creation processing, or at any timing after the sale of the product (for example, at a timing when maintenance management or observation of product use state is started) separately from the manufacturing process.

Next, trace functions of the information management system according to Embodiment 1 are described. The trace functions are provided by the traceability control section 124. In Embodiment 1, the analysis control section 123 can provide various types of analysis functions. For example, the analysis control section 123 can extract a group of products (population) satisfying a certain condition or extract any product satisfying a certain condition. The traceability function provided by the analysis control section 123 is described herein.

FIG. 11 is a diagram for explaining a trace function of "the manner of making" from "the manner of using" according to Embodiment 1. In Embodiment 1, each of the manufacturing processes is organized in the achievement record representing "the things performed, and the states and situations during the performance" and is accumulated in a data model of "the manner of making." Referring to the manufacturing recipe achievement data as an example, it can be seen from the example of FIG. 7 that the solder application at the flow rate XX was performed at the facility 1 during the CPU mounting. The group of sensor values associated with the flow rate XX obtained from the actual measurement values is stored in the sensor value DB 139. In a data model of "the manner of using," the operation situation history and the maintenance history are accumulated in the maintenance management data model.

It is assumed that a problem occurs in the CPU from the viewpoint of "the manner of using." When the manufacturing achievement model is searched by using the manufacturing serial ID "12345" (S21), "the manner of using" in each manufacturing process can be found. The manufacturing serial BOM can be used to retrieve the same product including the CPU having the same component item number. However, it is not possible to extract any candidate which may have the same problem based on the "thing performed, and the state and situation during the performance." Specifically, in a conventional case as shown in FIG. 11, if a problem also occurs in the CPU of a desktop PC having a manufacturing ID "F2345," the same product can be retrieved (S22), but it is difficult to find the relationship with the manufacturing serial ID "12345."

To address this, the traceability control section 124 refers to the distributions of sensor values indicating the solder flow rates during the CPU mounting in the substrate assembly steps of the products having the manufacturing serial ID "12345" and the manufacturing serial ID "F2345" which suffered from the same problem, and can find a common factor "CPU mounting solder flow rate" to the same problem when both products have the same distribution of sensor values.

The traceability control section 124 uses the distribution of sensor values associated with the common factor "CPU mounting solder flow rate" to the problem, refers to manufacturing recipe achievement data of another tablet PC, and performs pattern matching with a group of sensor values successive in time series in the sensor value DB 139 to extract any candidate product having the same "manner of making" (a product with a manufacturing serial ID "G2345" which has no problem but is likely to have a problem afterward).

As described above, each manufacturing process is organized in the form of achievement record representing the "thing performed, and the state and situation during the performance" and is accumulated in the data model of "the manner of making," so that the trace function provided in Embodiment 1 can extract, as the candidate which may suffer from the problem, the products having the same "manner of making" from across different types of products based on the similarity in "the manner of making."

FIG. 12 is a diagram for explaining a trace function provided by combining "the manner of using" with "the manner of making" according to Embodiment 1. In the example of FIG. 11, the fact of the occurrence of the problem is traced based on "the manner of using." In contrast, the example oaf FIG. 12 shows a mode in which the similarity in "the manner of using" and the similarity in "the manner of making" are used to extract any product which has no problem but is likely to have a problem afterward.

As shown in FIG. 9, the product operation situation history is accumulated, and the sensor information from the operation situation monitoring is also accumulated in time series in the maintenance management model. The traceability control section 124 refers to the distributions of temperature sensor values in the information about "the manner of using" of the products having the manufacturing serial ID "12345" and a manufacturing serial ID "S1234" which suffered from a problem, and can find a common factor "large temperature changes" to the same problem when both products have the same distribution of sensor values (S31) to the above example, the traceability control section 124 can use the distribution of sensor values associated with the common factor "large temperature change" to the problem, refer to "the manner of using" of another server, and perform pattern matching with the associated group of sensor values to specify the product having the manufacturing serial ID "S1234."

In addition, the traceability control section 124 can refer to the distribution of sensor values indicating the solder flow rates during the CPU mounting in the substrate assembly step of the product having the manufacturing serial ID "12345" which suffered from the problem (S32), perform pattern matching with a group of sensor values of the product having the manufacturing serial ID "S1234" (S33), and find a common factor "CPU mounting solder flow rate" to the same problem when both products have the same distribution of sensor values.

When the common factor in "the manner of making" is found in addition to the common factor in "the manner of using" (S34), the traceability control section 124 can extract the product having the manufacturing serial ID "S1234" as a product which has no problem but is likely to have a problem afterward (S35).

As described above, the trace function according to Embodiment 1 can use the similarity in "the manner of making" and/or the similarity in "the manner of using" as a key to extract the candidate which may suffer from a problem from across different types of products based on the achievement record representing the "things performed, and the states and situations during the performance" and the group of sensor values accumulated in the data model.

FIG. 13 is a diagram for explaining an analysis function associated with "the manner of using" according to Embodiment 1. The examples of FIG. 11 and FIG. 12 show the traceability function based on "the manner of using" accumulated in the maintenance management model. In contrast, the example of FIG. 13 show a traceability function based on "the manner of using" accumulated in the product use model.

As described above, the product use achievement data as shown in FIG. 9 related to the manner of using the product obtained from a predetermined field service or monitoring system is accumulated in the product use model. Unlike the maintenance management data, the product use achievement data mainly includes product operation events, alert histories, and sensor values detected in time series.

The traceability control section 124 according to Embodiment 1 uses the product use achievement data to extract, as an event pattern, a time-series pattern of event histories associated with alert histories, and performs pattern matching with the product use achievement data of a different manufacturing serial ID based on the event pattern to extract any product having a different manufacturing serial ID which shows predetermined similarity.

Specifically, as shown in FIG. 13, it is assumed that an HDD alert occurs for "excessive temperature" from the viewpoint of "the manner of using" based on the product event history or alert history. The traceability control section 124 can refer to event histories before and after the alert "HD alert for excessive temperature" to estimate (specify) the event pattern involved in the alert "HDD alert for excessive temperature." In the example of FIG. 13, the traceability control section 124 extracts, as the event pattern involved in the alert "HDD alert for excessive temperature," the time-series pattern from HDD cooling fan actuation, to transition to a sleep mode, and then to transition to a normal mode (S41). The extraction of the event pattern can be performed by extracting an optimal event pattern, for example from a plurality of products having the same alert "HDD alert for excessive temperature," with a known technique as appropriate.

The traceability control section 124 uses the event pattern extracted at step S41 and performs pattern matching by referring to an event history (product use achievement data) of a different manufacturing ID in which the alert "HD alert for excessive temperature" has not occurred (S42). When the result of the pattern matching shows that the same event pattern is included (S43), that is, the common factor in "the manner of using" is found, the traceability control section 124 can extract the product having the manufacturing serial ID "S1234" as a product which has no problem but is likely to have a problem afterward (S44).

As described above, Embodiment 1 can rely on not only the spot information such as the failure history and the replacement history accumulated in the maintenance management model but also the daily use state of the product to extract the product having the same "manner of using" from the same type of products or different types of products as the candidate for the problem. It should be noted that the traceability function shown in the example of FIG. 13 can be applied to the mode associated with "the manner of making" shown in FIG. 12. For example, the traceability control section 124 can extract a common factor in "the manner of making" related to the alert "HDD alert for excessive temperature," and when a common factor in both of "the manner of making" and "the manner of using" is found, extract a product of a different manufacturing serial ID as a product which has no problem but is likely to have a problem afterward.

While the information management system according to Embodiment 1 has been described above, the information management system cooperates with the downstream field/product use process over the entire product life cycle centered on the product process. In addition, as shown in FIG. 13, the information management system can be configured as a system which organizes the information collected from the data sources and accumulates the collected information in each of the data models based on the data structure definition for retrospectively presenting a clear picture of the things performed, and the states and situations during the performance in "the manner of using" in the field/manufacturing use area.

Thus, the information management system described above can be configured as an information management system for managing the manner of product use performed in the field/product use process in the market. Specifically, the information management system can be configured to include the storage section storing the data model (the maintenance management model, the product use model) created based on information related to the manner of product use obtained from a predetermined system such as a predetermined field service system and/or a product monitoring system or from the product, the data model corresponding to the area where achievement data (maintenance management data, the product use achievement data) from the field/product use process is accumulated; the information collection section configured to collect various types of data forming the achievement data from the data source involved in the field/product use process; and a field/product use management section configured to store the achievement data in the associated data model. The field/product use management section corresponds to the manufacturing management section 121. The field/product use management section is configured to use the various types of data to create the achievement data according to the data structure definition template for organizing the various types of data in association with the thing performed and the situation during the performance in the field/product use process, and to store the achievement data in the associated data model so as to record changes over time in the achievement data organized according to the data structure definition template.

As described above, the information management system can manage the manner of using the product in the market performed in the field/product use process and provide "the things performed, and the states and situations during the performance" simultaneously with the information accumulation by focusing on "the manner of using" in the field/manufacturing use area.

The information management system according to Embodiment 1 can also be configured to include a plurality of interconnected information management apparatuses 100 such that the achievement models managed individually by the information management apparatuses 100 are linked to each other. FIG. 14 is a diagram for explaining an example of the system configuration in which achievement models managed individually by a plurality of info nation management apparatuses 100 are linked to each other.

In the example of FIG. 14, a manufacturer and part manufacturer which belong to the manufacturing process in FIG. 1 are linked to each other, a repair factory and a product sales company which belong to the field/product use process are linked to each other, and the manufacturing process side and the field/product use process side are linked to each other.

FIG. 15 is a diagram showing an example of achievement data management (manufacturing/running achievement data, manufacturing recipe achievement data, and manufacturing quality inspection data of components) in the part manufacturer shown in FIG. 14. As described above, components for manufacturing products by the manufacturer can be procured from the part manufacturer. In this case, the manufacturing management of the component is performed by the part manufacturer, and the information management apparatus 100 (100B) according to Embodiment 1 can be introduced in the part manufacturer to accumulate information in the data model and provide the "things performed, and the states and situations during the performance." The part manufacturer is independent of the information management system 100 (100A) in the manufacturer but can be linked thereto through the procurement achievement data or the manufacturing serial BOM.

Similarly to the manufacturer, the part manufacturer performs manufacturing planning for components and accumulates actual manufacturing achievement and facility apparatus running achievement. In addition to the achievement data (data model) shown in FIG. 15, the part manufacturer can accumulate achievement data related to the facility management model and the procurement achievement model for parts which constitute, components.

In the example of FIG. 15, the information is saved which represents that a facility A (subject) started the manufacturing of the "object" shown in the component manufacturing/running achievement data, that is, a motherboard having a manufacturing item number (D-001) and a serial ID (31235) at 10:30 on Aug. 20, 2016 as planned, and completed the mounting of parts including a capacitor chip having a component item number (D1-001) and a serial ID (331234), a CPU socket having a component item number (D2-001) and a serial ID (331235), and a memory socket, having a component item number (D3-001) and a serial ID (331236). Similarly to the above case, data is organized and accumulated according to the data structure definition based on "6W1H" described above.

The detailed achievement of each object in the component manufacturing/running achievement data is stored in manufacturing recipe achievement data. Similarly to the manufacturer, the achievement is stored which represents that the capacitor chip having the component item number (D1-001) and the serial ID (331234) and corresponding to "object" in the manufacturing/running achievement data was mounted on the motherboard having the manufacturing item number (D-001) and the serial ID (31235) by reflow (situation) at a temperature YY at 10:00 on Aug. 20, 2016 (time). Similarly to the above case, the sensor value detected in real time is accumulated in "situation" of the manufacturing recipe achievement data.

The component manufacturing/running achievement data also includes an inspection process performed in an inspection facility A. Specifically, manufacturing quality inspection data in FIG. 15 shows that the inspection of mounting of the capacitor chip having the component item number (D1-001) and the serial ID (331234) on the motherboard having the manufacturing item number (D-001) and the serial ID (31235) and corresponding to "object" in the manufacturing/running achievement data was performed at 15:00 on Aug. 20, 2016, and as a result, the achievement (situation) indicating no problem found in mounting check is stored. Similarly, the achievements of mounting of the CPU socket and memory socket are also stored.

The accumulated manufacturing/running achievement data allows the information management apparatus 100B in the part manufacturer to create a manufacturing serial BOM (Bill Of Materials) for each component as shown in FIG. 5. The serial ID of the motherboard at the top of the hierarchy of the component serial BOM can be linked to the component manufacturing serial BOM of the laptop PC manufactured by incorporating this motherboard.

As described above, the data models are managed separately by the information management apparatuses 100A and 100B in the manufacturer and the part manufacturer, respectively, located on the manufacturing information platform, and the achievement data in the apparatus 100A and the achievement data in the apparatus 100B are linked to each other. This configuration can retrospectively present a clear picture of the things performed, and the states and situations during the performance not only in the product but also in the components forming the product.

In the example of FIG. 14, information management apparatuses 100C and 100D can be installed in the repair factory and the product sales company, respectively, which belong to the field/product use process. For example, in the information management apparatus 100C, the data model for accumulating the maintenance history shown in FIG. 9 is provided, and repair schedules (including a plan made in response to a repair request) and repair achievements are organized according to the data structure definition template and accumulated in time series in each data model.

In the information management apparatus 100D, for example, the data model for accumulating after-sales care such as the product sales achievement and the operation situation history shown in FIG. 9 is provided, and a product sales plan, sales achievement, repair request plan, and its achievement are organized according to the data structure definition template described above and are accumulated in time series in each data model.

In the example of FIG. 15, the information management apparatuses 100C and 100D manage the achievement data about sold products and their repair and have a relationship in which a product requested from the product sales company is repaired by the repair factory, so that they can be linked to each other through the product serial ID.

The information management apparatuses 1000 and 100D can also be linked to the information management apparatus 100A in the manufacturer through the product serial ID. The distributed link between the information management apparatuses 100A, 100C, and 100D excluding the part manufacturer corresponds to the information management performed by the single information management apparatus 100 using each of the data models in the manufacturing process and the field/product use process.

The manufacturing information platform has been described in Embodiment 1 with the example of the computer apparatus such as the "laptop PC" as the product. However, the present invention can be applied as an information management system for managing a manufacturing process and a field/product use process for cars, by gray of example. Similarly to the above example, when cars are used as the product, a supplier of parts forming a car, a dealer, and a repair factory can be linked to each other through a single information management apparatus 100 or a plurality of information management apparatuses 100 to perform information management.

Variations

Embodiment 1 has been described in conjunction with the mechanism in which the three data models are provided for accumulating various types of information collected from the data sources, and the information to be accumulated in the three data models is extracted (selected) according to the data structure definition including "subject (Who)," "object (Whom)," "event (What)," "time (When)," "place (Where)," and "situation (How)" (5W1H) and is structured for each data model. The accumulated information can be connected with a predetermined quality control rule, for example a manufacturing step characteristic factor called "4M," "5M," "5M1E," and "6M." The planning data formed of 5W1H and their achievement values can be used to perform analysis from the viewpoint of the manufacturing step characteristic factor, for example from the viewpoint of quality in the manufacturing step, including manufacturing step situation analysis in a facility and man P s intervention in the manufacturing step.

Next, the manufacturing step characteristic factor is described.

Depending on a management target, "4M" has four elements including person (Man), machine (Machine), material (Material), and method (Method) in a machining site, or person Man), machine (Machine), media and environment Media), and management (Management) in cause analysis and measures examination for accidents and disasters. "5M" is used for classification in quality control in factories and has five elements including worker (Man), machine and facility (Machine), material (Material), work method (Method), and measurement (Measurement). Since the manufacturing step may not be stable depending on the environment, quality control may also be performed by "5M1E" including an additional environment (Environment) element to "5M," or "6M" including an additional management (Management) element to "5M" for controlling the overall process.

For the worker (Man), the rate of product failure may depend on the skill of the worker, and the quality control can be performed based on a work history or change, history of the worker (history representing change from worker A to worker B). In the embodiment, the procurement achievement data shown in FIG. 6 is connected with the man (Man) of the step characteristic factor. Specifically, the achievement is stored which represents that procurement person A (staff serial ID 5555) purchased the motherboards (object) having the component item number (D-001) and serial IDs (31234-) corresponding to "object" in the manufacturing/running achievement data from a company A at 10:00 on Aug. 25, 2016. Based on the work performed by the procurement person A, it is possible to find that the components purchased from the company A were manufactured in the factory B of the company A.

The facility maintenance history shown in FIG. 8 is connected with the man (Man) of the step characteristic factor. Specifically, as shown in FIG. 8, the facility maintenance history stores which worker (Mr. A) performed what type of maintenance (including part replacement and repair) on which facility apparatus (facility 1) when, and the history of a part (such as a serial ID) replaced in the maintenance, thereby making it possible to present the details of facility maintenance performed by worker A.

For the machine and facility (Machine), product quality characteristics may depend on the machine and facility, or quality specifications may vary when maintenance of the machine and facility is performed such as replacement or adjustment. Thus, quality control can be performed based on a manufacturing step achievement using the machine and facility or a change history (maintenance history) In the embodiment, the manufacturing/running achievement data, the manufacturing recipe achievement data, the manufacturing quality inspection data shown in FIG. 6, and the facility alert history and the facility maintenance history shown in FIG. 8 are connected with the machine and facility (Machine) of the step characteristic factor. Specifically, the manufacturing/running achievement data shown in FIG. 6 includes the substrate assembly achievement which represents that the facility 1 installed at the third station of the first line of substrate assembly in a substrate assembly step started the manufacturing of the motherboard having the component item number (D-001) and the serial ID (31235) at 10:30 on Sep. 2, 2016, and completed the mounting of the CPU having the component item number (E-001) and the serial ID (41234) and the mounting of the memory having the component item number (F-001) and the serial ID (41235), thereby making it possible to present the manufacturing/running achievement in the facility A. Similarly, the manufacturing recipe achievement data, the manufacturing quality inspection data, and the facility alert history and the facility maintenance history shown in FIG. 8 can be connected with the machine and facility (Machine) of the step characteristic factor to present what was performed at which facility when.

For the material (Material), the product yield from the same material may depend on where to purchase or the brand. Thus, quality control can be performed based on a material change history (history representing changes in suppliers or materials). In the embodiment, the procurement data shown in FIG. 6 is connected with the material (Material) of the step characteristic factor. Specifically, the achievement is stored which represents that procurement person A (staff serial ID 5555) purchased the motherboards (object) having the component item number (D-001) and serial IDs (31234-) corresponding to "object" (Material) in the manufacturing/running achievement data from a company A at 10:00 on Aug. 25, 2016, thereby making it possible to present the fact that the components (Material) purchased by the procurement person A from the company A were manufactured in the factory B of the company A.

For the work method (Method), the work efficiency may depend on the work method, or the work efficiency may vary when procedures are changed in a plurality of work methods. Thus, quality control can be performed based on a change history (changes in procedures or work details) of the work method. In the embodiment, the manufacturing recipe achievement data shown in FIG. 6 is connected with the work method (Method) of the step characteristic factor.

Specifically, the manufacturing recipe achievement data stores the achievement which represents that the CPU having the component item number (E-001) and the serial ID (41234) and corresponding to "object" in the manufacturing/running achievement data was mounted onto the motherboard having the component item number (D-001) and the serial ID (31235) by soldering to the motherboard (situation) at the flow rate XX at 10:30 on Sep. 2, 2016 (time), thereby making it possible to present what type of work method (condition) was used for manufacturing.

For the measurement (Measurement), the measurement values may be different or unstable depending on the measurer, measurement device, and measurement method. Thus, quality control can be performed based on a change history of the measurement (changes in measurer, measurement device, and measurement method). In the embodiment, the manufacturing quality inspection data shown in FIG. 6 is connected with the measurement (Measurement) of the step characteristic factor. Specifically, as shown in the manufacturing quality inspection data, the inspection of mounting of the CPU having the component item number (E-001) and the serial ID (41234) on the motherboard having the manufacturing item number (D-001) and the serial ID (31235) corresponding to "object" in the manufacturing/running achievement data was performed at 11:00 on Sep. 2, 2016, and as a result, the achievement (situation) indicating no problem found in mounting check (power source check) is stored, thereby making it possible to present what type of check was performed on what (measurement method).

For the environment (Environment), the manufacturing step (including the inspection step) may be unstable when changes occur in temperature, humidity, season, time, vibrations, sounds, and light. Thus, quality control can be performed based on a change history of the environment (environment change in each manufacturing step). In the embodiment, the humidity sensor values and the like accumulated in the sensor value DB shoe in FIG. 7 are connected with the environment (Environment) of the step characteristic factor.

As described above, the information structured according to 5W1H and accumulated in the three data models where various types of information collected from the data sources are accumulated are connected with the perspective of analysis to allow the analysis from various viewpoints. While the manufacturing step characteristic factor is used, for the perspective of analysis in the above description, the present invention is not limited thereto, and analysis can be performed in another perspective.

As described above, the information extracted (selected) according to the data structure definition including "5W1H," structured and accumulated for each data is used to create the data structure definition according to the quality control rule (the manufacturing step characteristic factor called "4M," "5M," "5M1E," and "6M") based on the connected information from the viewpoint of the predetermined quality control rule (the manufacturing characteristic step (including 5M1E). In this case, the data structure definition according to the quality control rule can be used as the data structure definition for analysis (which may be a template).

Each of the functions of the information management apparatus 100 described above can be implemented by a program. A computer program previously provided for implementing each function can be stored on an auxiliary storage apparatus, the program stored on the auxiliary storage apparatus can be read by a control section such as a CPU to a main storage apparatus, and the program read to the main storage apparatus can be executed by the control section to perform the function of each component.

The program may be recorded on a computer readable recording medium and provided for the computer. Examples of the computer readable recording medium include optical disks such as a CD-ROM, phase-change optical disks such as a DVD-ROM, magneto-optical disks such as a Magnet-Optical (MO) disk and Mini Disk (MD), magnetic disks such as a Floppy Disk® and removable hard disk, and memory cards such as a Compact Flash®, art media, SD memory card, and memory stick. Hardware apparatuses such as an integrated circuit (such as an IC chip) designed and configured specifically for the purpose of the present invention are included in the recording medium.

While the embodiment of the present invention has been described, the embodiment is only illustrative and is not intended to limit the scope of the present invention. The novel embodiment can be implemented in various other forms, and various omissions, substitutions, and modifications can be made thereto without departing from the spirit or scope of the present invention. The embodiment and its variations are encompassed within the spirit or scope of the present invention and within the invention set forth in the claims and the equivalents thereof.

DESCRIPTION OF THE REFERENCE NUMERALS

100 INFORMATION MANAGEMENT APPARATUS
110 COMMUNICATION APPARATUS
120 CONTROL APPARATUS
121 MANUFACTURING MANAGEMENT SECTION
122 INFORMATION COLLECTION SECTION
123 ANALYSIS CONTROL SECTION
124 TRACEABILITY CONTROL SECTION
130 STORAGE APPARATUS
131 MANUFACTURING/RUNNING MODEL DB
132 MANUFACTURING SERIAL BOM
133 MANUFACTURING RECIPE MODEL DB
134 MANUFACTURING QUALITY INSPECTION MODEL DB
135 PROCUREMENT ACHIEVEMENT MODEL DB
136 FACILITY MANAGEMENT MODEL DB
137 MAINTENANCE MANAGEMENT MODEL DB
138 PRODUCT USE MODEL DB
139 SENSOR VALUE DB

The invention claimed is:

1. An information management system for managing manufacturing achievement performed in each of manufacturing processes, comprising:
one or more processors programmed to:
store a data model created based on product manufacturing planning, the data model corresponding to an area where manufacturing achievement data from a manufacturing process is accumulated and including a manufacturing achievement model associated with the manufacturing process;
collect various types of data forming the manufacturing achievement data from a data source involved in the manufacturing process;
store the manufacturing achievement data in the associated data model;
use the various types of data to create the manufacturing achievement data according to a data structure definition template for organizing the various types of data in association with a thing performed and a situation during the performance in the manufacturing process;

store the manufacturing achievement data in the associated data model so as to record changes over time in the manufacturing achievement data organized according to the data structure definition template;
store a plurality of groups of sensor values in time series, each group of sensor values pertaining to a common measurement target, detected over the course of manufacturing based on the manufacturing process in association with the manufacturing achievement data stored in the manufacturing achievement model;
store the manufacturing achievement data in connection with a manufacturing serial ID for identifying each of a plurality of products manufactured in the manufacturing process,
use a manufacturing serial ID of a product specified based on information related to a manner of product use obtained from one of
a predetermined system, and
the specified product to extract one of the groups of sensor values pertaining to a respective common measurement target in the manufacturing process of the specified product; and
use the extracted group of sensor values as an extraction pattern including the sensor values pertaining to the respective common measurement target to extract a product having another manufacturing serial ID and having a predetermined similarity of sensor values pertaining to the measurement target with the specified product.

2. The information management system according to claim 1, wherein the data model is created for each of the plurality of manufacturing processes in accordance with the product manufacturing plan, and
the manufacturing achievement data stored in the data model includes product individual identification information collected from the data source and time information related to manufacturing achievement.

3. The information management system according to claim 1, wherein
the data model further includes a maintenance management model corresponding to an area where maintenance achievement data related to a manner of product use obtained from the one of the predetermined system and the specified product is accumulated;
the maintenance achievement data stored in the maintenance management model is stored in association with a group of sensor values in time series obtained as information related to a manner of product use; and
the one or more processors is/are further programmed to:
store the maintenance achievement data in connection the manufacturing serial IDs identifying each of the plurality of products manufactured in the manufacturing process,
use a manufacturing serial ID in the maintenance achievement data to extract a group of sensor values in the information related to the manner of product use and a group of sensor values in the manufacturing process, and
use the extracted groups of sensor values as extraction patterns to extract a product having another manufacturing serial ID based on similarity in a manner of product making based on the manufacturing process and similarity in the manner of product use.

4. The information management system according to claim 1, wherein
the data model further includes a product use model corresponding to an area where product use achievement data related to a manner of product use obtained from the one of the predetermined system and the specified product is accumulated;
the product use achievement data stored in the product use model includes a product event history and an alert history detected in time series in information related to a manner of product; and
the one or more processors is/are further programmed to:
stores the product use achievement data in connection with the manufacturing serial IDs identifying each of the plurality of products manufactured in the manufacturing process,
use the product use achievement data to extract a timer-series pattern in the event history associated with the alert history as an event pattern, and
perform pattern matching with the product use achievement data of a different manufacturing serial ID based on the event pattern to extract a product having the different manufacturing serial ID and having predetermined similarity.

5. An information management system for managing a manner of product use performed in a field/product use process in a market, comprising:
one or more processors programmed to:
store a data model created based on information related to a manner of product use obtained from one of a predetermined system and a specified product, the data model corresponding to an area where achievement data from the field/product use process is accumulated;
collect various types of data forming the achievement data from a data source involved in the field/product use process;
store the achievement data in the associated data model;
use the various types of data to create the achievement data according to a data structure definition template for organizing the various types of data in association with a thing performed and a situation during the performance in the field/product use process;
store the achievement data in the associated data model so as to record changes over time in the achievement data organized according to the data structure definition template;
store a plurality of groups of sensor values in time series, each group of sensor values pertaining to a common measurement target, as the information related to the manner of product use in association with the achievement data stored in the model;
store the achievement data in connection with a serial ID for identifying each of a plurality of products in the market,
use a serial ID of the product specified to extract one of the groups of sensor values pertaining to a respective common measurement target in the information related to the manner of product use of the specified product; and
use the extracted group of sensor values as an extraction pattern including the sensor values pertaining to the respective common measurement target to extract a product having another serial ID and having a predetermined similarity of sensor values pertaining to the measurement target with the specified product.

* * * * *